United States Patent
Coutts

(10) Patent No.: US 7,545,960 B2
(45) Date of Patent: Jun. 9, 2009

(54) BIOMETRIC SYSTEM

(75) Inventor: Michael Coutts, Dundee (GB)

(73) Assignee: NCR Corporation, Dayton, OH (US)

( * ) Notice: Subject to any disclaimer, the term of this patent is extended or adjusted under 35 U.S.C. 154(b) by 697 days.

(21) Appl. No.: 11/273,483

(22) Filed: Nov. 14, 2005

(65) Prior Publication Data

US 2006/0140460 A1    Jun. 29, 2006

(30) Foreign Application Priority Data

Dec. 11, 2004    (GB)    ................... 0427205.0

(51) Int. Cl.
*G06K 9/00* (2006.01)
(52) U.S. Cl. ...................... 382/115; 382/124
(58) Field of Classification Search ......... 382/115–116, 382/124–127; 713/102, 186; 235/382, 382.5, 235/380; 340/5.62, 5.53, 5.82, 5.83
See application file for complete search history.

(56) References Cited

U.S. PATENT DOCUMENTS 5,761,330 A    6/1998 Stoianov et al.
6,434,259 B1    8/2002 Hamid et al.
6,826,306 B1    11/2004 Lewis et al.
7,039,224 B2 *    5/2006 Hamid et al. ............... 382/124
2002/0152034 A1 *    10/2002 Kondo et al. ................. 702/19
2002/0154793 A1    10/2002 Hillhouse et al.

FOREIGN PATENT DOCUMENTS

| EP | 1 251 468 A2 | 10/2002 |
| EP | 1 416 427 A2 | 5/2004 |
| WO | WO 87/00332 | 1/1987 |
| WO | WO 91/08555 | 6/1991 |

* cited by examiner

*Primary Examiner*—Yon Couso
(74) *Attorney, Agent, or Firm*—Priest & Goldstein PLLC

(57) ABSTRACT

A biometric system for obtaining a biometric enrolment measurement is described. The system comprises a biometric capture unit for capturing biometric data from a user and a control means for producing a biometric match template there from. The control means also analyses the template to determine if the enrolment measurement may be susceptible to allowing false acceptances when in use. This is achieved by using the match template to verify against a number test templates, which have been created from earlier acquired biometric measurements, of the same class, obtained from other sources. If one or more false accepts are detected the enrolment measurement may be rejected.

25 Claims, 3 Drawing Sheets

BIOMETRIC SYSTEM

BACKGROUND

The present invention relates to a biometric system, and particularly to a biometric system for improving capture of a human characteristic by a biometric sensor. The invention also relates to a self-service terminal incorporating such a biometric system.

Biometrics is the measurement of some physical or biological trait or characteristic pertaining to an individual for use in confirming or determining the individual's identity.

Biometric systems are typically used in applications where secure access is required. Secure access may relate to physical locations (such as parts of a building), electronic devices and systems (such as automated teller machines, cellular telephones, personal computers), and software applications.

Secure access may be provided by a user typing in data, such as login codes or passwords. However, these can be compromised relatively easily if a third party becomes aware of the data to be typed in. Secure access may also be provided by identification card and personal identification number (PIN) combinations, such as is commonly required at automated teller machines (ATMs). However, this can also be compromised if the card details and the PIN are obtained by a third party.

Biometric systems have the advantage that a trait of an individual is measured to determine if that individual should be allowed access to a secure area or device. This makes it much more difficult for a third party to gain access because no memory based data entry occurs. However, biometric systems have the disadvantage that it is relatively difficult to obtain an accurate reading from an individual, particularly if the individual is a member of the public who has not been trained in how to use the biometric system, and if the system is used in an unattended environment.

One example of an application where biometric systems are used with members of the public is ATMs. An ATM is a particular type of self-service terminal (SST). SSTs are generally public-access devices that are designed to allow a user to conduct a transaction or to access information in an unassisted manner and/or in an unattended environment. SSTs typically include some form of tamper resistance so that they are inherently resilient. SSTs allow users to obtain information or to conduct a transaction, and include: ATMs; non-cash kiosks that allow users to access information (for example, to view reward points on a reward card the user inserts into the SST); and kiosks that accept payment for services (for example, Web surfing kiosks, kiosks that allow users to buy goods, and such like). The term SST has a relatively broad meaning and includes vending machines.

Biometric systems operate by initially obtaining one or more biometric measurements from a given subject, which might be an iris scan, a finger print or the like. Typically these initial measurements are compressed into a smaller form know as a template, which is stored in a database or local storage medium, such as a Smart card from which it can be retrieved at a later time.

A major problem in operating a biometric system lies in the accurate capture of a suitable enrolment image. Therefore, the original enrolment phase is critical to the subsequent performance of the biometric system. If a poor quality enrolment image is introduced into the system then the subsequent template generated will only contain a limited number of unique markers that identify that individual. This can lead to two undesirable situations. Firstly, with only a limited number of unique identifiers to match against, the individual may not be successfully identified when they come to provide a subsequent verification image. This is known as a false negative or false reject. Similarly with said limited number of unique identifiers available a potential attacker, who has a similar style of biometric measurement, may be accepted by a biometric system, which is known as a false positive or false acceptance.

SUMMARY

It is among the objects of an embodiment of the present invention to obviate or mitigate one or more of the above disadvantages or other disadvantages associated with prior art biometric systems.

According to a first aspect of the present invention there is provided a biometric system comprising a biometric capture unit for capturing biometric data from a user; and a control means for producing a biometric template there from and for analyzing said template to determine if the enrolment measurement may be susceptible to allowing false acceptances when in use, by using the template as a test template against which templates created from biometric measurements obtained earlier from other sources are compared, and a decision as to whether or not to accept the enrolment measurement is made dependent on the number of false accepts detected.

Preferably, the biometric capture unit is a fingerprint capture unit.

Most preferably, the biometric measurement is utilized to create a test template using a standard biometric algorithm.

Most preferably, the enrolment measurement is run through a simple algorithm to identify the class of measurement to which it belongs and only earlier templates created from that class are tested against the enrolment template.

Preferably, the control means utilizes an arithmetic algorithm to determine the acceptability or not of the enrolment measurement.

Preferably, the algorithm is based upon the number of successful attacks or upon the average score returned from the attack.

In a preferred embodiment the biometric system as described above comprises a user interface means arranged to inform the user if the measurement is not acceptable and the same test process is then repeated until an acceptable measurement is obtained.

Preferably, the control means is arranged to determine the acceptance of an enrolment measurement dependent upon the appropriate threshold for measurement acceptance, balanced against the need to enroll as many new users as possible, In one embodiment the user interface means provides a visual indication to the user as to whether or not the biometric capture was successful.

In one embodiment the visual indication is a colored light. Preferably, the user interface comprises one or more light emitting diodes (LEDs) located adjacent the biometric capture unit, so as to provide the user with feedback regarding the capture of their fingerprint.

According to a second aspect of the present invention there is provided a self-service terminal incorporating a biometric system as described above.

Preferably, the terminal comprises an automated teller machine.

According to a third aspect of the present invention there is provided a method of obtaining a biometric enrolment measurement from a user, the method comprising: capturing a biometric measurement from a user; producing a biometric template there from; and analyzing said template to determine if the enrolment measurement may be susceptible to allowing false acceptances when in use, by using the template as a test template against which test templates, created from measurements obtained earlier from other sources are compared, and a decision as to whether or not to accept the enrolment measurement is made dependent on the number of false accepts detected.

Preferably, the biometric measurement is obtained from a fingerprint.

Most preferably, the biometric measurement is utilized to create a match template using a standard biometric algorithm.

Most preferably, the enrolment measurement is run through a simple algorithm to identify the class of measurement to which it belongs and only earlier measurements from that class are tested against the enrolment template.

In one embodiment an arithmetic algorithm is used to determine the acceptability or not of the enrolment measurement.

In one embodiment the algorithm is based upon the number of successful attacks or upon the average score returned from the attack.

Most preferably, the user is informed if the measurement is not acceptable and the same test process is then repeated until an acceptable measurement is obtained.

Preferably, the acceptance of an enrolment measurement is dependent upon the appropriate threshold for measurement acceptance, balanced against the need to enroll as many new users as possible, Preferably, a visual indication is provided to the user as to whether or not the biometric capture was successful. The visual indication may be a colored light or an on screen indication including, at least, one of text, animation or graphic.

24. According to a fourth aspect of the present invention there is provided a computer program for analyzing the acceptability of a biometric enrolment measurement, arranged to produce a biometric template from the enrolment measurement and to analyze said template to determine if the enrolment measurement may be susceptible to allowing false acceptances when in use, by using the template as a match template against which earlier test templates, created from biometric measurements obtained from other sources, are compared, and a decision as to whether or not to accept the enrolment measurement is made dependent on the number of false accepts.

Preferably, the biometric measurement is, at least one of, a fingerprint, voice print, facial image, iris scan or finger geometry.

Preferably, the measurement is utilized to create a test template using a standard biometric algorithm.

In one embodiment the enrolment measurement is run through a simple algorithm to identify the class of measurement to which it belongs and only earlier test templates created from biometric measurements from that class are tested against the enrolment match template.

Preferably, an arithmetic algorithm is used to determine the acceptability or not of the enrolment measurement.

Most preferably, the algorithm is based upon the number of successful attacks or upon the average score returned from the attack.

In one embodiment the user is informed if the measurement is not acceptable and the same test process is then repeated until an acceptable measurement is obtained.

Most preferably, the acceptance of an enrolment measurement is dependent upon the appropriate threshold for measurement acceptance, balanced against the need to enroll as many new users as possible, In one embodiment indication is provided to the user as to whether or not the biometric capture was successful.

The visual indication may be a colored light or on screen prompt.

In one embodiment feedback means located adjacent to the biometric capture unit for providing the user with an indication of the extent to which an acceptable measurement has been captured.

BRIEF DESCRIPTION OF THE DRAWINGS

Embodiments of the present invention will now be described, by way of example, with reference to the accompanying drawings, in which.

DETAILED DESCRIPTION

Figure 1:
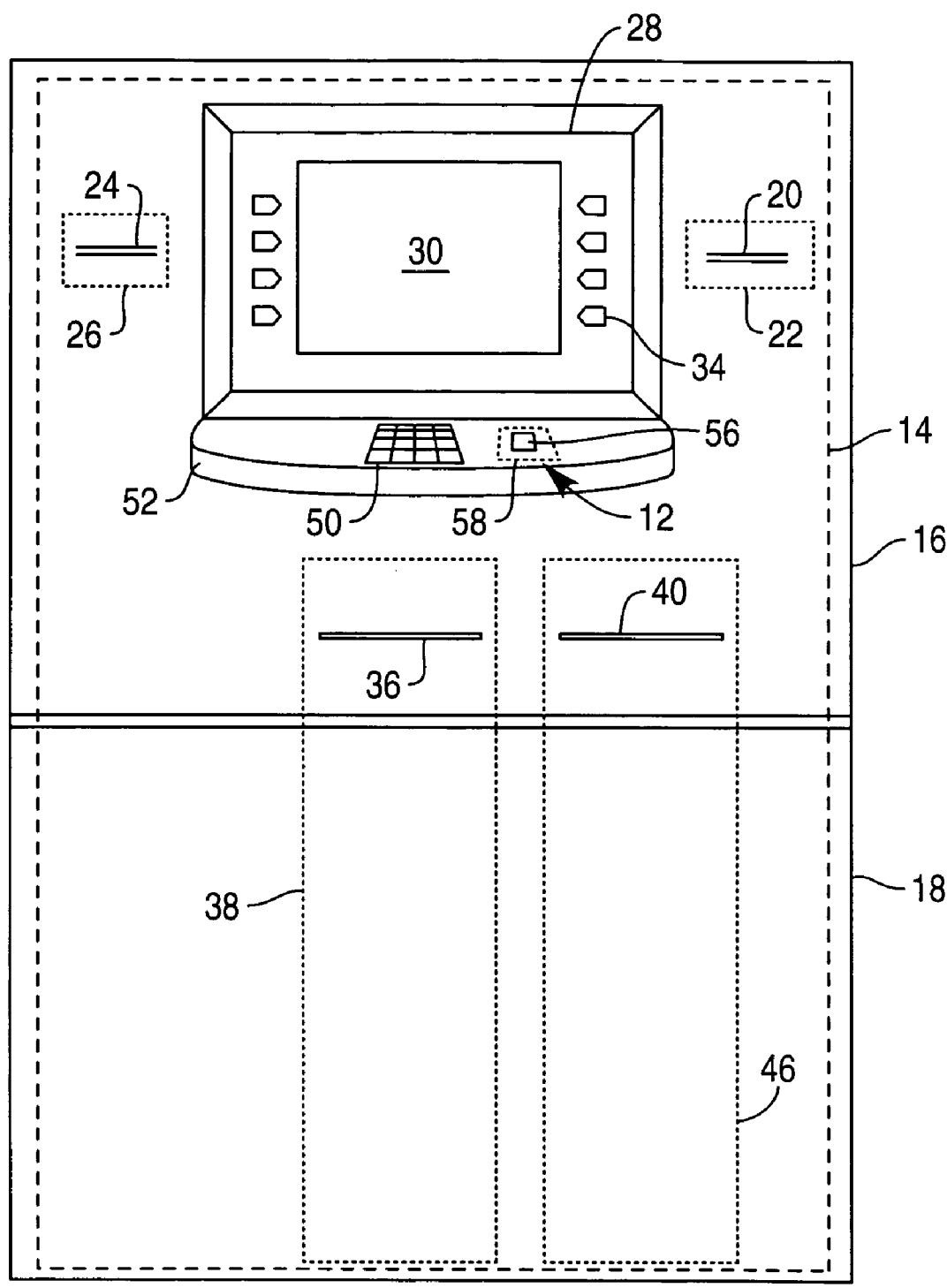
FIG. 1 is a simplified schematic front view of a self-service terminal incorporating a biometric system in accordance with a first embodiment of the present invention.
Figure 2:
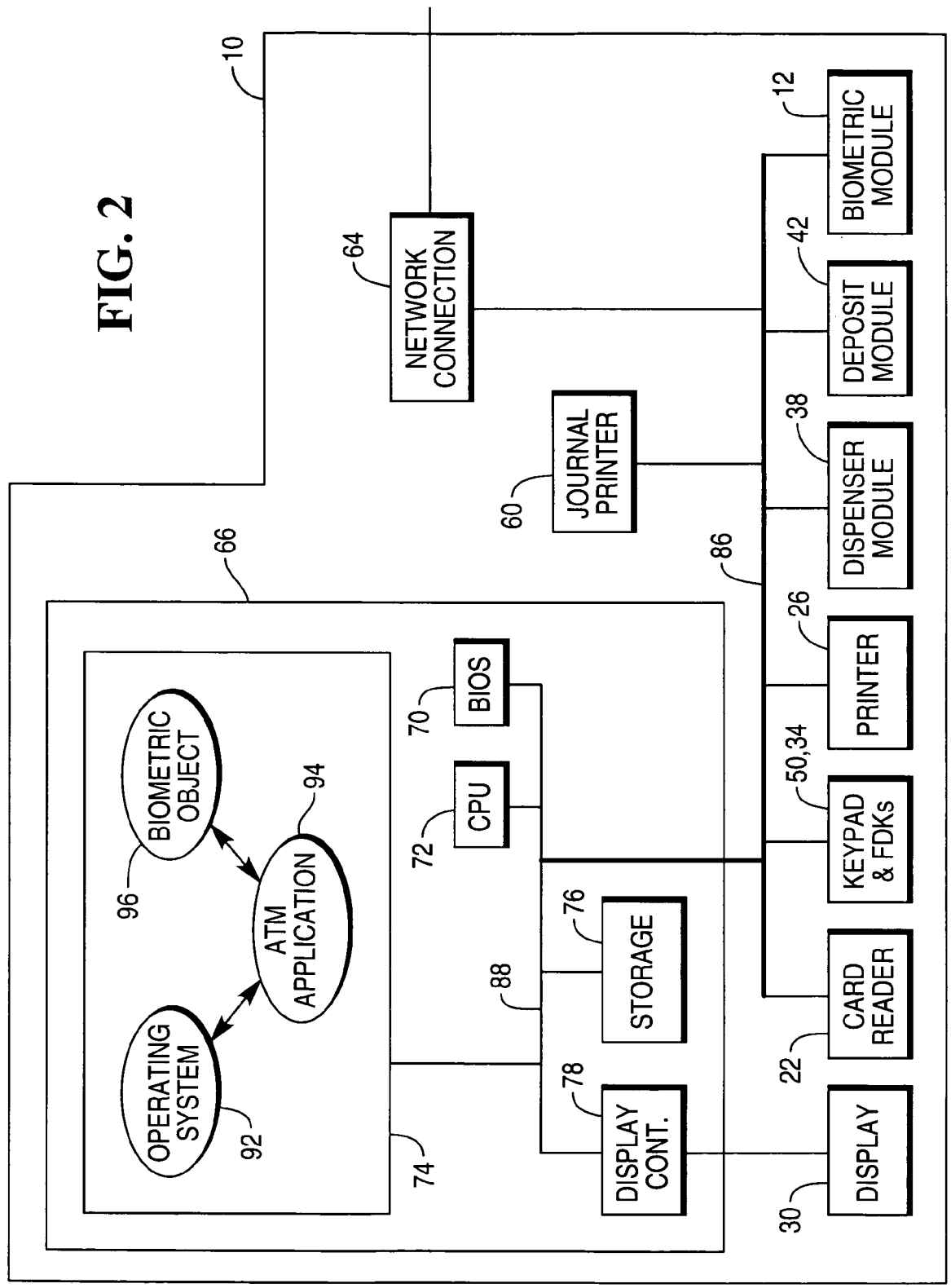
FIG. 2 is a block diagram showing internal modules in the terminal of FIG. 1.

Reference is now made to FIGS. 1 and 2, which show a self-service terminal 10 in the form of an automated teller machine (ATM) including a biometric module 12 according to one embodiment of the invention. The ATM 10 has a chassis 14 to which is pivotably coupled a plastic fascia 16 covering an upper portion of the chassis 14. A door 18 is hingably coupled to a lower portion of the chassis 14. When the fascia 16 is hinged open and the door 18 is swung open, an operator can gain access to modules located within the ATM 10.

The fascia 16 provides a user interface to allow a user to interact with the ATM 10. In particular, the fascia 16 has apertures aligning with modules mounted in the chassis 14 when the fascia 16 is pivoted to the closed position. The fascia 16 defines: a card reader slot 20 aligning with a card reader module 22 mounted within the chassis 14; a receipt printer slot 24 aligning with a receipt printer module 26 mounted within the chassis 14; a display aperture 28 aligning with a combined display 30 and associated function display keys (FDKs) 34 mounted as a module within the chassis 14; a dispenser slot 36 aligning with a dispenser module 38 mounted within the chassis 14; and a deposit aperture 40 aligning with a deposit module 42 mounted within the chassis 14.

The fascia 16 also includes an encrypting keypad 50 mounted on a shelf portion 52 extending outwardly from beneath the display aperture 28. The encrypting keypad 50 also receives input from the FDKs 34.

The biometric module 12 is mounted in the shelf portion 52 and includes (i.) a sensor 56 for receiving a human finger and for capturing fingerprint details, and (ii.) an interface 58 for encrypting and relaying a captured fingerprint measurement. The sensor 56 protrudes through an aperture in the shelf portion 52, and the interface 58 is mounted behind the shelf portion 52.

The biometric sensor 56 is a Fingerloc™ AF-S2 fingerprint sensor, available from Authentec, Inc., P.O. Box 2719, Melbourne, Fla. 32902-2719, U.S.A. Alternative sensors may also be utilized.

The sensor 56 comprises an array of pixels arranged in rows and columns. A fingerprint measurement is scanned by digitizing outputs from each row in a programmed sequence. The outputs can be analyzed to determine the centre of the user's finger, for example, in terms of an x and y co-ordinate of the core of the print within the image.

Internally, the ATM 10 also includes a journal printer module 60 for creating a record of every transaction executed by the ATM 10, a network connection module 64 for accessing a remote authorization system (not shown), and a controller module 66 (in the form of a PC core) for controlling the operation of the ATM 10, including the operation of the modules.

The controller 66 comprises a BIOS 70 stored in non-volatile memory, a microprocessor 72, associated main memory 74, storage space 76 in the form of a magnetic disk drive, and a display controller 78 in the form of a graphics card.

The display module 30 is connected to the controller module 66 via the graphics card 78 installed in the controller module 66. The other ATM modules (12, 22, 26, 34, 38, 42, and 50) are connected to the ATM controller 66 via a device bus 86 and one or more internal controller buses 88.

In use, the main memory 74 is loaded with an ATM operating system kernel 92, an ATM application 94, and a biometric capture object 96. As is well known in the art, the operating system kernel 92 is responsible for memory, process, task, and disk management. The ATM application 94 is responsible for controlling the operation of the ATM 10. In particular, the ATM application 94 provides the sequence of screens used in each transaction (referred to as the transaction flow); monitors the condition of each module within the ATM (state of health monitoring); and obtains authorization for transactions from a remote transaction authorization server (not shown).

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

The biometric capture object 96 receives data from the sensor 56, processes this received data, and forwards the processed data to the ATM application 94 for use in authenticating a user.

The controller 66 (particularly the biometric capture object 96) and the biometric module 12 together comprise a biometric system. The display 30 provides a feedback means for this biometric system.

Prior to conducting a transaction, a user enrolls by providing one or more biometric measurements, such as his or her fingerprint, in order to allow for the creation of a biometric template. This enrolment typically occurs at a bank branch or other secure facility so that additional forms of identification (for example, a driver's license, a passport, or such like) may be provided to ensure that the person submitting the fingerprint is who they claim to be. However, an SST, such as an ATM, can be utilized in capturing this biometric measurement and in creating a corresponding biometric template.

To provide a sample, the user places his finger on a fingerprint sensor similar to sensor 56 shown in FIG. 1. The user's fingerprint is sensed and a template is generated based on the user's fingerprint. The template is a data file that is produced by applying a conventional mathematical operation to measurements taken from the captured fingerprint. Each user has a unique template.

When a user subsequently presents himself at the ATM 10 and places his finger on the sensor 56, the sensor 56 captures the fingerprint and the biometric capture object 96 operates on the newly-captured fingerprint to produce a match template [typically only held in memory, not committed to disk.

The match template is then used, in verification mode, in which the user claims an identity, for example by inserting an identification card. The template for that user is retrieved by the biometric capture object 96 and compared with the match template to determine if the user's identity is verified. However, false positives or false accepts, where the wrong person is accepted as the user, and false negatives or false rejects, where the user is erroneously refused entry, can both occur if the quality of the initial biometric template is not sufficient for use with the system, as described above.

Fingerprint classification is a known technique to assign a fingerprint into one of the several pre-specified types already established in the literature which can provide an indexing mechanism. In fingerprint classification an input fingerprint is first matched at a coarse level to one of the pre-specified types and then, at a finer level, it is compared to the subset of the database containing that type of fingerprints only. Known algorithms have been developed to classify fingerprints into five classes, namely, whorl, right loop, left loop, arch, and tented arch. Further information on this classification can be found in "Fingerprint Identification", by Salil Prabhakar, Anil Jain at http://biometrics.cse.msu.edu/fingerprint.html.

However, in accordance with the present invention, it was determined during the testing of a large number of live fingerprint measurements that where a given user had a poor enrolment measurement (small amount of measurement captured, poor contrast between ridges and troughs etc.) that the templates generated from these measurements were more susceptible to generating false acceptances. It was further realized that the finger prints which were most successful in producing false acceptances had two distinguishing features. Firstly they were typically also of poor quality and secondly, they had to be from the same class of fingerprint.

Furthermore, a means and method of utilizing this realization in order to provide for good quality biometric enrollment measurement capture was determined.

Figure 3:
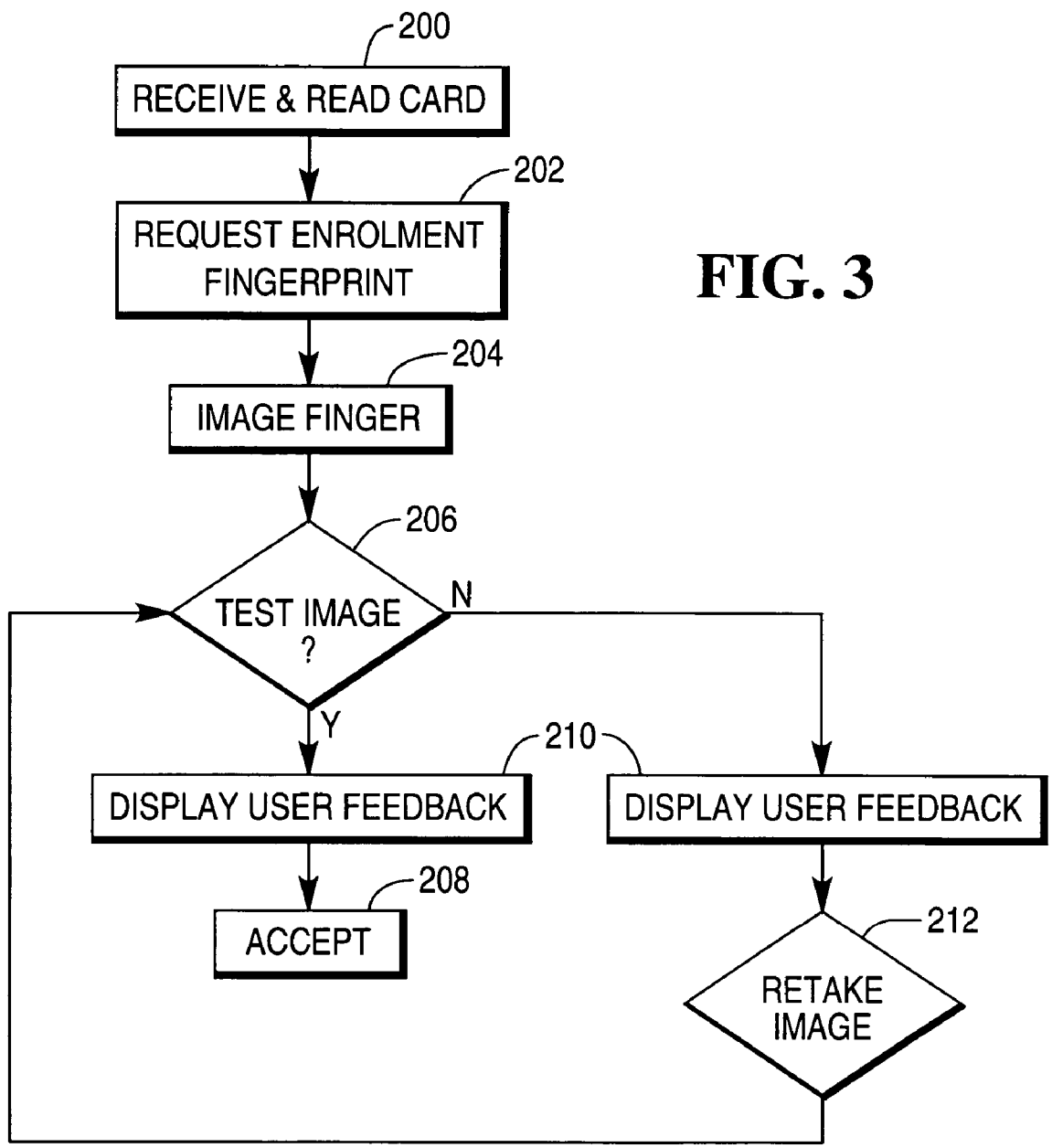
FIG. 3 is a flowchart illustrating the steps involved in obtaining a valid biometric template.

FIG. 3 is a flowchart illustrating steps performed by a biometric capture device, in accordance with an embodiment of the present invention, to capture a biometric and ensure that the biometric is of acceptable quality.

Initially, a user is identified and a card to which the biometric information is to be stored is inserted into a biometric reader, possibly within a SST (step 200). A card is, of course, not the only means by which a user's biometric template can be stored. However, a card or other form of claim of identity (social security number, RFID) is always required for verification.

A user is then requested to place his finger on the reader for the enrolment measurement, or measurements, to be taken (step 202). The measurement is then read by the reader (step 204).

The measurement is then utilized to create a test template using a standard biometric algorithm (e.g. Authentec or Bio-Scrypt). The enrolment measurement is then run through a simple algorithm to identify the class of measurement that it belongs to. The standard biometric verification algorithm is then used in an attempt to verify a small number of candidate (attack) measurements, of the same class as the enrolment measurement, against the test template. A simple arithmetic algorithm perhaps based upon the number of successful attacks or upon the average score returned from the attack can then be used to determine the quality (acceptability or not) of the enrolment measurement (step 206).

If the measurement is acceptable, then the user need not re-enroll. The user is informed that the measurement is acceptable (step 210) and the measurement is accepted and a full biometric template is generated and stored (step 208). However, if the measurement is not acceptable the user is informed (step 210) and the measurement is retaken (step 212).

The same test process is then run again (step 206) and if the measurement is acceptable it is accepted and a full biometric template is generated and stored as appropriate (card, server) (step 210) or the user is informed to try again (step 212) and the loop is repeated until an acceptable measurement is obtained.

Various modifications may be made to the above-described embodiments within the scope of the present invention, for example, different colors may be used to provide user feedback. It is also possible to apply this technique to the verification (rather than enrolment) phase. So we may be able to address the situation where potential attackers discover that providing faint or purely defined images may increase their potential to be falsely accepted. By utilizing the same image quality process to incoming verification images we can reject poor quality images prior to conducting the verification process. This also may be of benefit where remote processing of verification images is conducted and where ensuring that we do not waste bandwidth by sending up poor quality images for remote verification.

What is claimed is:

1. A biometric system comprising:
    a biometric capture unit operative to capture a biometric data sample comprising a biometric measurement from a user; and
    control means operative to produce a reference biometric template from the biometric data sample, the reference biometric template comprising a set of biometric reference data used to authenticate the biometric data sample read from the user, the control means being further operative to validate the template, validation comprising performing a plurality of test authentication each test authentication comprising using the template for attempted authentication of one of a plurality of known invalid biometric data samples, validation of the biometric template failing if the test authentications indicate greater than a predetermined susceptibility to false acceptances and succeeding if the test authentications do not so indicate.

2. A biometric system as claimed in claim 1, wherein the biometric capture unit comprises a fingerprint capture unit.

3. A biometric system as claimed in claim 1, wherein the biometric data sample is examined to identify the classification of the biological feature from which it was taken, and wherein known invalid data samples taken from biological features belonging to the same classification are used for validation of the reference template.

4. A biometric system as claimed in claim 1, wherein validation is based upon the number of acceptances returned from test authentications using the reference template for authentication of each of the plurality of known invalid data samples.

5. A biometric system as claimed in claim 1, further comprising user interface means arranged to inform the user if the measurement is not acceptable, wherein the biometric data capture unit is operative to capture a new biometric data sample from the user and the control unit is operative to validate a new reference template based on the new data sample, new samples being captured and validated successful validation is achieved.

6. A biometric system as claimed in claim 5, wherein the user interface means provides a visual indication to the user as to whether or not the biometric capture was successful.

7. A biometric system as claimed in claim 6, wherein the visual indication comprises a colored light.

8. A biometric system as claimed in claim 5, wherein the user interface comprises one or more light emitting diodes (LEDs) located adjacent the biometric capture unit and wherein one or more of the LEDs are illuminated in such a way as to provide the user with feedback regarding the capture of the user's fingerprint.

9. A method of obtaining a biometric enrolment measurement from a user, the method comprising:
    capturing a biometric measurement from a user, by a biometric capture unit;
    producing a reference biometric template therefrom, the reference biometric template comprising a set of reference biometric data, by a processor
    storing the reference biometric template in a memory accessible by a processor; and
    validating the reference template, validation comprising performing a plurality of test authentications, each test authentication comprising using the reference template for attempted authentication of one of a plurality of known invalid reference data samples;
    determining that the reference template is invalid and that validation has failed if the test authentications indicate greater than a predetermined susceptibility to false acceptances, and that validation has succeeded if the test authentications do not so indicate, by the processor.

10. A method a claimed in claim 9, wherein the biometric measurement is obtained from a fingerprint.

11. A method as claimed in claim 9, wherein the biometric measurement is examined to identify a classification of the biological feature from which it was taken, and wherein known invalid data samples taken from features belonging to the same classification are used for validation of the reference template.

12. A method as claimed in claim 9, wherein validation is based upon the number of acceptances resulting from use of the reference template for authentication of the plurality of known invalid data samples.

13. A method as claimed in claim 9, further comprising the steps of:
    upon a validation failure and until a successful validation is achieved;
        informing the user that the validation failed;
        capturing a new biometric data sample from the user, by the biometric capture unit;
        creating a new reference template based on the new data sample; and
        performing validation on the new reference template.

14. A method as claimed in claim 13, wherein a visual indication is provided to the user as to whether or not the biometric capture was successful.

15. A method as claimed in claim 14, wherein the visual indication is a colored light or an on screen indication including, at least, one of text, animation or graphic.

16. A computer readable medium stoma a program of instructions executable by a processor, the program of instructions controlling the processor so as to perform the steps of:
  directing a biometric capture unit to capture a biometric measurement for a user;
  producing a reference biometric template therefrom, the reference biometric template comprising a set of reference biometric data;
  storing the reference biometric template in a memory accessible by the processor; and
  validating the reference template, validation comprising performing a plurality of test authentications, each test authentication comprising using the reference template for attempted authentication of one of a plurality of known invalid reference data samples; and
  determining that the reference template is invalid and that validation has failed if the test authentications indicate greater than a predetermined susceptibility to false acceptances, and that validation has succeeded if the test authentications do not so indicate.

17. A computer readable medium as claimed in claim 16, wherein the biometric measurement is, at least one of, a fingerprint, voice print, facial image, iris scan or finger geometry.

18. A computer readable medium as claimed in claim 16, wherein the biometric measurement is examined to identify a classification of a biological feature from which it was taken, and wherein known invalid data samples taken from features belonging to the same classification are used for validation of the reference template.

19. A computer program as claimed in claim 16, wherein validation is based upon the number of acceptances returned from use of the reference template for authentication of the plurality of known invalid data samples.

20. A computer readable medium as claimed in claim 16, wherein the stored instructions comprise instructions controlling the processor to perform the steps of:
  upon a validation failure and until a successful validation is achieved;
    informing the user that the validation failed;
    capturing a new biometric data sample from the user, by the biometric capture unit;
    creating a new reference template based on the new data sample; and
    validating the new reference template.

21. A computer program as claimed in claim 20, wherein a visual indication is provided to the user as to whether or not the biometric capture was successful.

22. A computer program as claimed in claim 21, wherein the visual indication comprises a colored light or on screen prompt.

23. A biometric system as claimed in claim 1, wherein a score is computed for each comparison of the reference sample with one of the plurality of known invalid data samples and wherein validation is based on an average score resulting from use of the reference template in authentication of the plurality of known invalid data samples.

24. A method as claimed in claim 9, wherein a score is computed for each comparison of the reference sample with one of the plurality of known invalid data samples and wherein validation is based on an average score resulting from use of the reference template in authentication of the plurality of known invalid data samples.

25. A computer readable medium as claimed in claim 16, wherein a score is computed for each comparison of the reference sample with one of the plurality of known invalid data samples and wherein validation is based on an average score resulting from use of the reference template in authentication of the plurality of known invalid data samples.

* * * * *

UNITED STATES PATENT AND TRADEMARK OFFICE
CERTIFICATE OF CORRECTION

PATENT NO. : 7,545,960 B2  Page 1 of 1
APPLICATION NO. : 11/273483
DATED : June 9, 2009
INVENTOR(S) : Michael Coutts It is certified that error appears in the above-identified patent and that said Letters Patent is hereby corrected as shown below:

Column 9, line 1, after "medium" delete "stoma" and insert --storing--.

Signed and Sealed this

Twenty-third Day of March, 2010

David J. Kappos
*Director of the United States Patent and Trademark Office*